Oct. 10, 1950   G. E. COXON ET AL   2,525,095
PRESSURE RESPONSIVE SENDING UNIT FOR INDICATORS
Filed Oct. 10, 1945   2 Sheets-Sheet 1
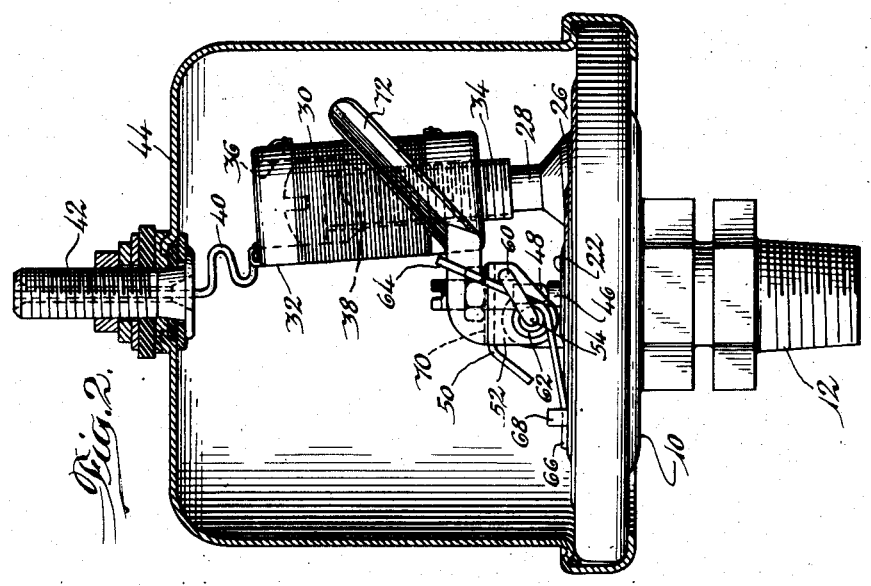
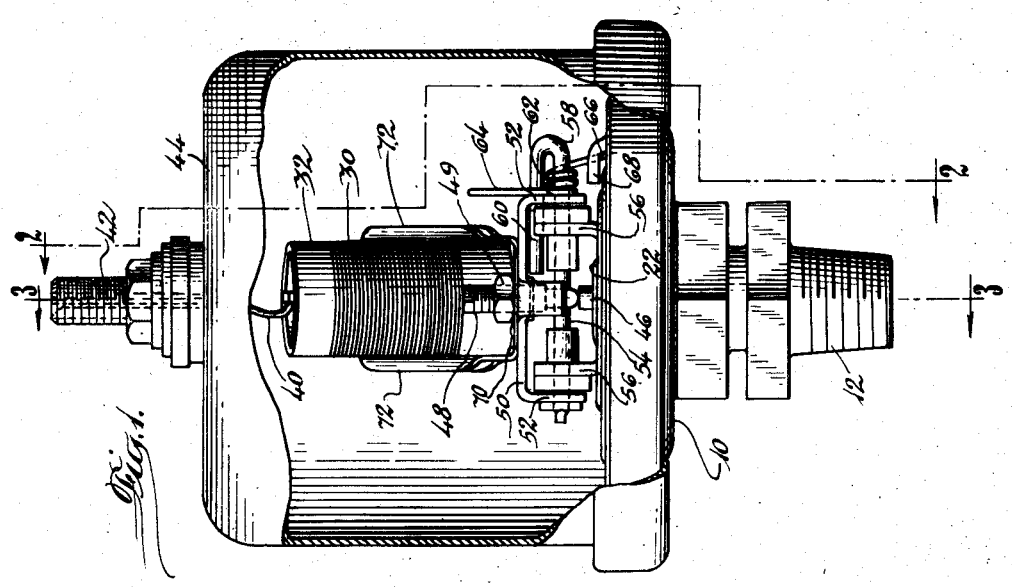
Inventors:
George E. Coxon
Thorolf Paul
By Williams, Bradbury & Hinkle
Attorneys

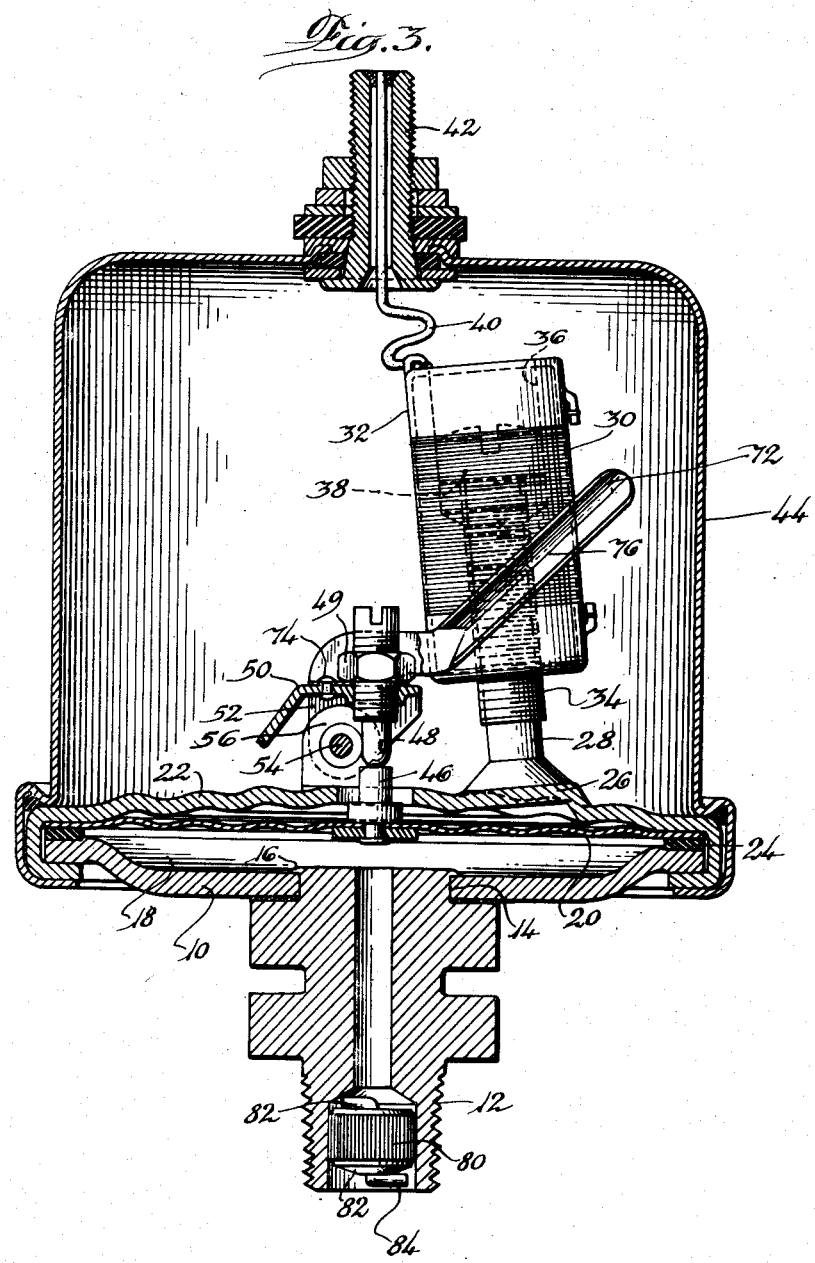

Patented Oct. 10, 1950

2,525,095

UNITED STATES PATENT OFFICE 2,525,095

PRESSURE RESPONSIVE SENDING UNIT FOR INDICATORS

George E. Coxon, Cicero, and Thorolf Paul, Chicago, Ill., assignors to Stewart-Warner Corporation, Chicago, Ill., a corporation of Virginia Application October 10, 1945, Serial No. 621,582

4 Claims. (Cl. 201—48)

This invention relates to a pressure responsive device and it is particularly concerned with a mechanism arranged to be actuated by variations of pressure of a fluid such as oil, water, air or other gas, and to transmit indications of such variations to an indicating device located at some distance from the actuated pressure responsive mechanism.

One object of the invention is to provide a new and improved pressure responsive means arranged to vary the resistance of an electrical circuit for producing indications of pressure by means of an electrically actuated instrument located at a distance from the pressure responsive means, and connected in the circuit.

Another object of the invention is to provide a pressure responsive device associated with an electrical resistance element designed for connection in circuit with an indicator responsive to changes in the current strength, and to include means actuated by changes in pressure for shifting a contact element along the resistance element bodily with respect to the contact element.

It is also an object of the invention to provide a new and improved pressure responsive device having motion transmitting means operative between a pressure responsive diaphragm and a movable contact element engaging a resistance coil, and to include an adjustable element in the motion transmitting means to be employed in the calibration of the device.

Other objects and advantages of the invention will appear from the following description taken in connection with the drawings, in which:

Fig. 1 is a front elevational view of a pressure responsive device embodying this invention with a portion of the casing broken away to reveal the interior structure;

Fig. 2 is a vertical section taken substantially as indicated at line 2—2 on Fig. 1, showing the interior structure in side elevation;

Fig. 3 is a vertical section on a larger scale taken as indicated at line 3—3 on Fig. 1.

There are many situations in connection with the operation of machinery in which it is necessary to provide an indication of pressure conditions in portions of the machinery which are not conveniently accessible for observation. Accordingly, a pressure responsive mechanism is installed adjacent the portion of the machine at which the pressure in question originates or is effective, and this device includes means for operating an indicating instrument located at a considerable distance where it can be conveniently observed by the engineer or operator in charge. The mechanism illustrated herein and embodying this invention is designed to respond to variations in fluid pressure, as for example, the pressure of the lubricating oil in an aircraft engine, and it includes means by which the variations of oil pressure actuate a rheostat or variable resistance device in an electrical circuit which in turn operates an electrical instrument in the nature of a galvanometer or volt meter graduated in terms of oil pressure and located in the pilot's cabin or in the engineer's compartment of the aircraft.

The drawings do not undertake to illustrate the pressure indicating instrument or the simple circuit in which it would be connected since these features may be conventional and are well understood by those skilled in the art. As shown in Figs. 1, 2, and 3, the pressure responsive device comprises a bottom wall 10 secured to a threaded fitting 12 which is adapted to be screwed into the threaded wall of a chamber or passage in which the oil under pressure is confined and it may be understood that the device may be similarly installed for measuring the pressure of various other fluids, including water, steam, air or gas. The upper end of the fitting 12 includes a reduced portion 14 which extends through a central aperture in the bottom wall 10 and is peened over at 16 in clamping engagement with the wall 10. A pressure chamber 18 is provided between the bottom wall 10 and a flexible diaphragm 20 which may have annular corrugations and which is clamped at its peripheral portion between the marginal portion of the bottom wall 10 and a top wall 22. This top wall is formed with an annular channel embracing the peripheral portion of the bottom wall 10 and pressed into clamping engagement with said wall and the diaphragm with a sealing washer 24 interposed. The top wall 22 is preferably formed with annular corrugations which register with those of the diaphragm 20, affording a maximum range of movement for the diaphragm and providing a stop against which it will be seated when the pressure in the chamber 18 reaches a certain predetermined value.

In addition to its annular corrugations, the top wall 22 is formed with a boss 26 which serves as a mounting base for the head of a screw 28 brazed or welded to the boss 26 to support a coil 30 of resistance wire connected in the electrical circuit by which variations of pressure are transmitted to an indicating instrument (not shown). The coil 30 is wound on a spool 32 which has a threaded bore engaging the threads 34 of the screw 28 and the upper end of the bore is enlarged at 36 to receive the head of the locking screw indicated in dotted outline at 38, so that when the spool 32 has been adjusted to the desired position on the mounting screw 28, the locking screw 38 can be set into abutting relation to the upper end of the screw 28 for securing the spool and its coil 30 at adjusted position. At the upper end, the coil is connected by a conductor 40 to a threaded binding post 42 which is supported in the top wall of an enclosing casing 44 and suitably insulated therefrom, and to which a connecting wire will extend to the indicating instrument, not shown.

The diaphragm 20 carries at its center a contact button 46 which engages the lower end of a contact screw 48 mounted in rocker yoke 50. This yoke includes arms 52, 52 which are apertured to fit a rocker shaft 54 journalled in standards 56 which preferably are bent up from the material of the top wall 22, and thus are mounted in fixed relation thereto. One end of the rocker shaft 54 is bent upon itself at 58 so that the bent end portion 60 extends through one of the arms 52 of the yoke 50, and thus interlocking the yoke with the rocker shaft 54. A spring 62 is coiled around the shaft 54 with one end 64 of the spring reacting against the bent end portion 60 of the rocker shaft, while the other end 66 of the spring is secured under a clip 68 formed up from the top wall 22. The spring maintains the screw 48 in contact with the button 46 so that variations of pressure in the chamber 18, causing movement of the diaphragm 20, will produce a corresponding rocking movement of the yoke 50 and the shaft 54 with which it is interlocked. A U-shaped contact member comprising a middle portion 70 and a pair of contact arms 72, 72 has its said middle portion 70 secured to the yoke 50 by rivets 74, with its contact arms 72 pressed yieldingly against opposite sides of the coil 30. Preferably, the arms 72 are of V-shaped cross section so that only the apex portions of the V-shaped section (indicated at 76 in Fig. 3) contact the curved surface of the coil 30, extending obliquely tangent to the surface of the coil and engaging only one or two turns thereof. As the button 46 rises or falls with variations of pressure in the chamber 18, the resulting rocking movement of the yoke 50 shifts the arms 72 along the cylindrical coil 30, causing them to engage different turns thereof at different positions. It being understood that the electrical circuit in which the coil 30 is included is grounded through the base or bottom wall 10 of the device, it will be seen that the movement of the yoke 50 and contact arms 72 varies the portion of the coil 30 which is an effective part of the circuit and thus varies the resistance of the circuit whereby a suitably calibrated instrument connected into the circuit at any point will reflect these variations of resistance and may be graduated to indicate the corresponding changes of pressure transmitted to the chamber 18 through the bore of the fitting 12. To protect the pressure responsive device against the shock of any sudden change in pressure or against vibration in the pressure fluid, a conventional damper may be secured in the enlarged portion of the bore of the fitting 12. As shown, this damper consists of a fluted metallic plug having an axial bore with a wire 84 extending loosely through the bore to serve as a restriction, the ends of the wire being bent to engage the ends 82 of the plug. For final calibration of the device in connection with a given electrical indicating instrument wired to the binding post 42, the contact screw 48 may be adjusted up or down in the threaded portion of the yoke 50 in which it is carried so as to alter the effective length of the screw as a connecting link between the yoke and the button 46. This adjustment will rock the yoke 50 to a limited extent about the axis of the shaft 54 and will correspondingly shift the arms 72 along the turns of the coil 30 so as to alter the resistance of the electrical circuit as desired and adjust the readings of the electrical instrument to correspond properly with the positions of the diaphragm 20 in response to changes of pressure in the chamber 18. When properly adjusted, the screw 48 may be secured by lock nut 49.

It will be understood that various changes may be made in the construction and arrangement of the parts without departing from the real spirit and purpose of the invention, and it is the intention to cover hereby any modified forms of structure or use of mechanical equivalents which may be reasonably included within the scope of the claims.

We claim:

1. In a pressure responsive sending unit, means forming a pressure chamber having spaced walls with a diaphragm sealed therebetween, one of said walls having oppositely disposed lugs upstanding therefrom and an inclined boss, means rockably supported upon said lugs including a contact member having an elongated linear contact surface inclined laterally relative to the axis of oscillation of said rockable means, means extending between said diaphragm and rockable means offset with respect to the axis of the latter for rocking said rockable means and contact member in response to movement of said diaphragm, means opposing such rocking movement, a stud on one side of said rockable means fixed to said boss and having its axis inclined toward said contact member, a resistor fixed on said stud and having at least a part of its peripheral surface in the plane of and inclined toward said contact member to maintain engagement between the resistor and contact surface throughout the range of movement of the contact member, said contact member and resistor being adapted to be connected in a circuit the resistance of which is determined by the position of the contactor lengthwise of the resistor.

2. In a pressure responsive sending unit, pressure responsive means including an element movable in response to variations in pressure in a fluid, a rockably supported contact member having an elongated linear contact surface inclined to one side of the axis of oscillation of said contact member, means operatively connecting said movable element and contact member for rocking the latter in response to movement of said movable element, a resistor adapted to be connected in a circuit with said contact member including a wound spool having a threaded aperture, a stud on the same side of the axis of oscillation of the contact member as its contact surface and inclined toward said surface for supporting said resistor in a position to maintain contact between the resistor and contact surface throughout the range of movement of the latter whereby the resistance of said circuit is varied in accordance with the position of the contact member lengthwise of the resistor, said stud being threaded to receive said spool and to permit axial adjustment of the resistor on the stud, and locking means threaded into the outer end of the spool for locking the resistor at a position.

3. In a pressure responsive sending unit, pressure responsive means including an element movable in response to variations in pressure in a fluid and a fixed wall, a contact member rockably supported upon said wall and having an elongated linear contact surface inclined laterally relative to the axis of said contact member, means operatively connecting said movable element and contact member for rocking the latter in response to movement of said movable element, a coil type resistor adapted to be connected in a circuit with said contact member, and a stud on the same side of the axis of oscillation of said contact member as its contact surface and inclined toward the same for supporting said resistor in a position to be tangentially engaged by the contact member throughout the range of its movement whereby the resistance of said circuit is varied in accordance with the position of the contact member lengthwise of the resistor, said resistor being axially adjustable on said stud.

4. In a pressure responsive sending unit, pressure responsive means including an element movable in response to variations in pressure in a fluid, a rockably supported contact member having an elongated linear contact surface adapted to sweep through an arc when said contact member is rocked, means operatively connecting said movable element and contact member for rocking the latter in response to movement of the movable element, a resistor adapted to be connected in a circuit with said contact member, and a stud extending cordally of the arc swept by said contact member for supporting said resistor with its outer surface in the plane swept by said contact surface whereby the resistance of said circuit is varied in accordance with the position of said contact member relative to said resistor, said resistor being axially adjustable relative to said stud.

GEORGE E. COXON.
THOROLF PAUL.

REFERENCES CITED

The following references are of record in the file of this patent:

UNITED STATES PATENTS

| Number | Name | Date |
|---|---|---|
| 1,019,075 | Nuckols and Pruyn | Mar. 5, 1912 |
| 1,739,942 | Bohlman | Dec. 17, 1929 |
| 2,152,262 | Klein et al. | Mar. 28, 1939 |
| 2,243,807 | Malone | May 27, 1941 |
| 2,256,473 | DeGiers | Sept. 23, 1941 |
| 2,283,378 | Liner | May 19, 1942 |
| 2,286,717 | Clason | June 16, 1942 |
| 2,297,437 | Stapelfeldt | Sept. 29, 1942 |
| 2,423,603 | McCandless | July 8, 1947 |
| 2,423,609 | Middleton et al. | July 8, 1947 |